United States Patent [19]

Tsuji et al.

[11] Patent Number: 4,659,187
[45] Date of Patent: Apr. 21, 1987

[54] ZOOM LENS USING ELEMENTS MADE OF PLASTIC MATERIALS

[75] Inventors: Sadahiko Tsuji, Kanagawa; Sadatoshi Takahashi, Tokyo, both of Japan

[73] Assignee: Canon Kabushiki Kaisha, Tokyo, Japan

[21] Appl. No.: 546,083

[22] Filed: Oct. 27, 1983

[30] Foreign Application Priority Data

Oct. 29, 1982 [JP] Japan .................. 57-191082

[51] Int. Cl.⁴ .................................. G02B 15/14
[52] U.S. Cl. ................................. 350/427
[58] Field of Search ..................... 350/423, 427

[56] References Cited

U.S. PATENT DOCUMENTS 3,912,379 10/1975 DeJager ............ 350/432 X
3,920,315 11/1975 Linke ................ 350/423
3,972,592  8/1976 Ruben .............. 350/423
4,557,567 12/1985 Azumi et al. ...... 350/427

FOREIGN PATENT DOCUMENTS 58-160910 9/1983 Japan ................ 350/427

Primary Examiner—John K. Corbin
Assistant Examiner—Scott J. Sugarman
Attorney, Agent, or Firm—Toren, McGeady and Goldberg

[57] ABSTRACT

A zoom lens with a frontmost lens group made to have the focusing function, said focusing lens group being provided with at least one member made of a plastic material. The other part of the lens system than the focusing lens group is constructed with lenses made of materials which assure that the focal length will not vary with variation of the surrounding temperature and humidity so that when focusing is followed by zooming displacement of the image plane can be prevented.

12 Claims, 7 Drawing Figures

ZOOM LENS USING ELEMENTS MADE OF PLASTIC MATERIALS

BACKGROUND OF THE INVENTION

1. Field of the Invention

This invention relates to zoom lenses and, more particularly, to the use of a plastic material in focusing lens members of the zoom lens.

2. Description of the Prior Art

There have been proposals for using lenses of a plastic material in the focusing members of the zoom lens in U.S. Pat. Nos. 3,920,315 and 3,972,592. These proposals are directed toward employment of such material in the zoom lenses for projectors. The disclosure of the first-named patent applies to use in the optical compensation type, and the disclosure of the second-named patent applies to use in the varifocal lens, so that in a rigorous sense, zooming accompanies shifting of the image plane. Therefore each time focusing is followed by zooming, the focusing members must be re-adjusted in position. Also, atmospheric or externally influencing factors, for example, surrounding temperature change and humidity change, have not been taken into account in all the previous proposals.

On the other hand, it is known to provide a fixed-focal length lens for photography using plastic lenses in the focusing members in Japanese Laid-Open Patent Application No. SHO 55-143518. In this case, the image shift resulting from the temperature change is reduced by combining a plurality of plastic lenses and by setting forth specific conditions for paraxial arrangement.

SUMMARY OF THE INVENTION

It is an object of the present invention to provide a zoom lens with a constituent element or elements made up of a plastic material while still maintaining the image plane substantially stable in position despite changes in temperature and humidity.

Another object of the present invention is to provide a zoom lens which has achieved an in reduction of the weight, low cost and improvement of the imaging performance.

In the zoom lens according to the present invention, the frontmost or first lens group is made to have the focusing function, and at least one of the members constituting this first lens group is made of a plastic material. A second lens group arranged on the image side of said first lens group is constructed with members so as to contribute to a negligible change of the focal length as the surrounding temperature and humidity change. Since the focal plane for the entire system of the zoom lens is formed in a prescribed position depending upon the focal lengths of the zoom lens groups, if the focal length of the second lens group remains unchanged, the optically conjugate point to the aforesaid focal point of the entire system of the zoom lens with respect to the second lens group takes always a constant position relative to the second lens group. In this optically conjugate position is formed an image of an object by said first lens group with means provided therein for assuring coincidence of the image point with the conjugate point regardless of any change of the focal length of the first lens group.

In the zoom lens of the present invention, the zooming provision may be made at the first lens group, or the second lens group, or both of the first and second lens groups.

DESCRIPTION OF THE PREFERRED EMBODIMENT

Figure 1:
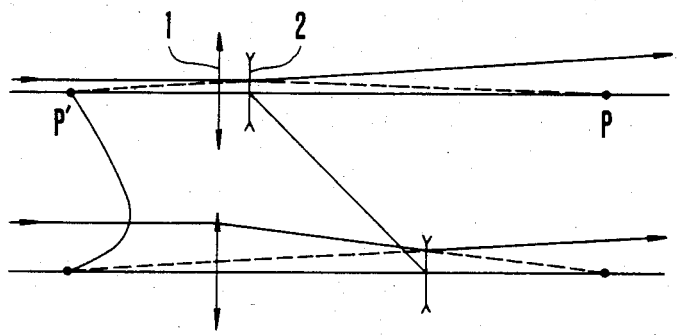
FIG. 1 is a diagram of geometry considered to explain the imaging relationship of the varifocal section of the zoom lens.

In FIG. 1 there is shown a paraxial ray starting from an infinitely distant object and passing through a first lens group 1 and a second lens group 2. What is called here the first lens group 1 is a movable lens group for focusing which remains stationary during zooming. Also what is called the second lens group 2 is a lens group movable for variation of the image magnification, or variator. The paraxial ray is refracted by the first lens group 1 to a point P at which an image of the object is formed. For the second lens group 2, the image point P serves as an object point. Thus, the paraxial ray is focused by the second lens group to form a virtual image at a point P'.

Here, let us consider a hypothetical case where the second lens group 2 has an image forming member made of a material of which the refractive index largely changes with temperature and humidity. Under a condition that part of the lens system which is positioned on the image side of the second lens group 2 is formed by lens members of which the focal lengths are all substantially invariable against the change of the temperature and humidity, there results that the optically conjugate relationship between the image plane of which the position is made fixed relative to the entire system of the zoom lens, and the aforesaid point P' with respect to a lens system that rearwardly follows the second lens group does not change. In other words, the conjugate point of the aforesaid rear lens system to the image plane always lies at the point P'. Therefore, taking this image plane as the start point, upon consideration of a paraxial ray advancing in a reversed direction to that in which the usual ray-tracing is carried out, change of the focal length of the second lens group 2 causes shift of the point P to which the ray starting from the image plane is focused by a lens system with inclusion of the second lens group 2. And the value of this shift differs with different zooming positions. Therefore, with the first lens group moved to effect focusing in such a manner that the ray starting from the object arrives at the point P, when zooming is later carried out, an image shift takes place.

Figure 2:
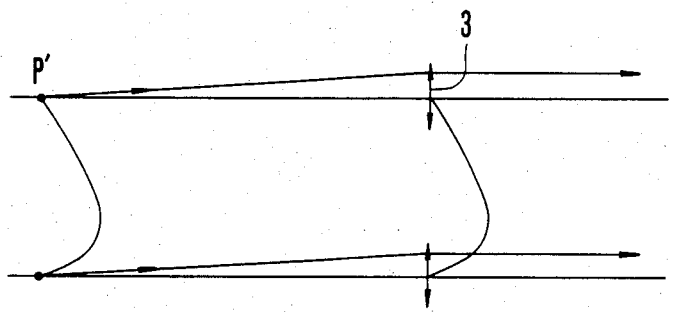
FIG. 2 is a similar diagram illustrating a practical example of the path of movement of the compensator of the zoom lens.

FIG. 2 illustrates a paraxial ray starting from the point P' of FIG. 1 and refracted by a third lens group 3 as the compensator to be parallel to the optical axis. By moving the third lens group 3 in such a manner that its front focal point is in coincidence with the path of movement of the point P' by zooming, the parallelism of the ray emerging from the third lens group with the optical axis is maintained, and the ray is allowed to be focused to one and the same point throughout the entire zooming range by a relay lens group (not shown). Assuming here that the third lens group is constructed by using an optical member of which the focal length changes as the surrounding temperature and humidity change, then this change of the focal length causes the image plane to be shifted by the same amount of length changed throughout the entire zooming range. In this case, if the relay lens system or the image plane is adjusted in position, the degree of image sharpness will not be varied with zooming. In the zoom lens having the focusing provision at the first lens group, however, it is required that the amount of movement of the front or first lens group 1 is changed by the square of the zoom ratio between the wide angle and telephoto positions. Otherwise, an image shift will result. With regard to the other types of zoom lenses, this principle is applied to their third lens group. Also in the case where the image forming system is constructed by using a lens member of which the refractive index is very susceptible to surrounding temperature and humidity, exactly the same result will be effected. As shown in FIG. 1 and FIG. 2, it is under the condition that the lens group arranged at the frontmost side has the focusing function that the use of a plastic lens in the rearwardly arranged lens group or groups of this focusing lens group gives rise to changing in position of the image plane as zooming is performed.

Figure 3:
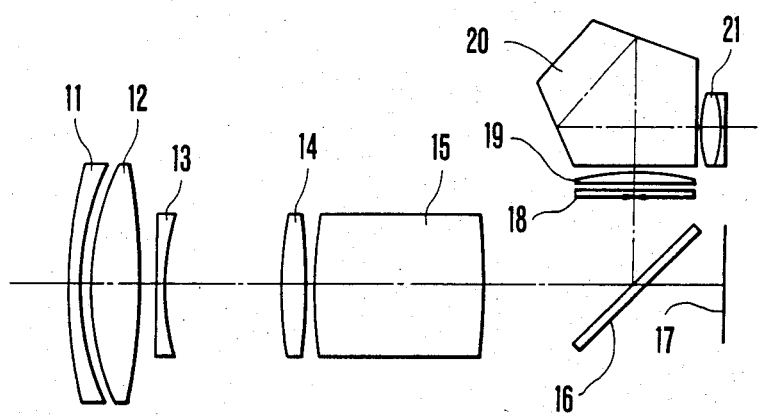
FIG. 3 is a schematic vertical section view of a single lens reflex camera employing one form of the optical system of the present invention.
Figure 4:
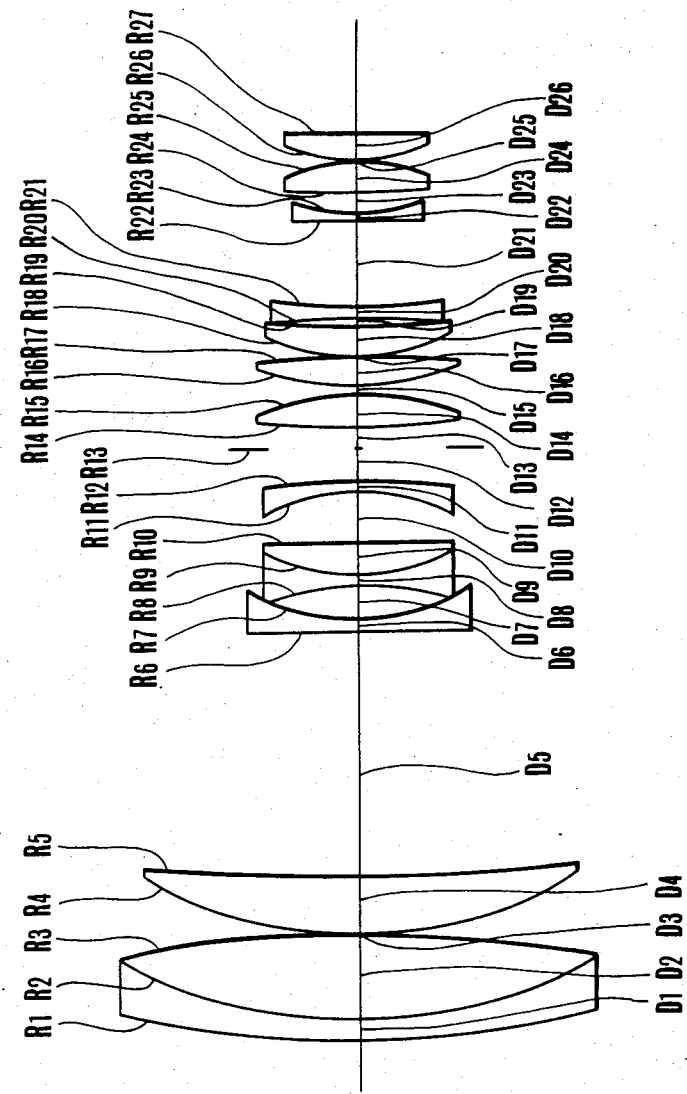
FIG. 4 is a longitudinal section view of a specific embodiment of a zoom lens according to the present invention.

Returning now to FIG. 1, let us consider another case where a lens of material having its refractive index which is very susceptible to surrounding temperature and humidity, for example, a plastic material, is made use of in the first lens group, while a lens system positioned on the image side of the first lens group is not comprised of any such lens. In this case, the optically conjugate point P of said lens system to the image plane for the entire system of the zoom lens takes a fixed position. Though change of the focal length of the first lens group causes spatial deviation of the focal point of the first lens group from the point P, if the first lens group is moved so as to bring the focal point of the first lens group 1 into coincidence with the point P, the degree of image sharpness is not changed by zooming. The requirement for maintaining the focal point of the first lens group in coincidence with the point P can be fulfilled by forming the infocus condition sensed at the image plane of the entire system. Therefore, when focusing adjustment of the first lens group is controlled by using the light passing through the zoom lens system, the image shift does not occur in the entire zooming range. FIG. 3 illustrates an embodiment of the present invention. In this drawing, the zoom lens comprises a first lens group 11, 12 forwardly and rearwardly movable for focusing, a second lens group 13 axially movable for variation of the image magnification, a third lens group 14 axially movable for compensating for the image shift resulting from the change in the image magnification, and a relay lens group 15 for image formation, wherein the lenses 11 and 12 are made of respective different plastic materials. As the material of the positive lens, use is preferably made of, for example, methyl methacrylate, and as the material of the negative lens preferably of styrene or polycarbonate, for good correction of chromatic aberration can be performed. It is also preferred to use at least one positive and at least one negative plastic lens. Such zoom lens is combined with a finder system including a mirror 16 for splitting the light bundle leaving the relay lens 15 into two parts, one of which reaches a photosensitive material 17 and the other of which is directed to a focusing screen 18 at a conjugate point to the focal point, a condenser lens 19, an erector or pentaprism 20 and eyepiece 21, thereby the image shift due to the change of the surrounding temperature and humidity can be compensated for when focusing is carried out by the first lens group while the image is being observed through the finder.

It should also be recognized that the lens system of such construction changes its image plane to different directions depending upon whether the temperature exceeds the higher or lower limit. To allow for focusing on an infinitely distant object to be effected at any temperature, therefore, the first lens group is required to be made movable rearwardly beyond the normal range when either the higher or the lower temperature limit is exceeded. On this account, as the operating mechanism for the first or focusing lens group has a stopper limiting the range to the infinitely distant object, it is preferred to alter the position of this stopper to a point beyond that terminal end of movement of the first lens group which focuses the lens system to the infinitely distant object. That is, even though the rays of light incident upon the first lens group are converging, it is made possible that the first lens group forms an image at the point P of FIG. 1.

The present invention has so far been described in connection with the one of the types of zoom lenses which has the first lens group stationary during zooming. It is, of course, possible to apply the above-described principles of the invention to the other types of zoom lens. For example, a zoom lens of the type in which the first lens group constitutes part of the zooming section, while still preserving an equivalent result can be even realized. As the operating mechanism for focusing a helicoid or the like may be considered, and it may be driven to move manually or by an electric motor. Also, for use as the image sharpness detecting means, a split prism, microprism or matted surface may be considered. Further, the autofocus mechanism may be employed. Also in the electronic view finders in the video cameras, equivalent results will be obtained. Also the use of the plastic material in the first lens group produces an advantage of greatly reducing the weight and production cost of that part of the otherwise constructed complete zoom lens by the ordinary glasses which accounts for about half of the total weight and cost. Another advantage arising from the use of easy manufacturing techniques for aspherical surfaces is that a valuable increaase in the imaging performance can be readily achieved.

An example of a specific zoom lens of the invention can be constructed in accordance with the numerical data given in the following table for the radii of curvature, R, the axial thicknesses and air separations, D, and the refractive indices, N, and the Abbe numbers, $\nu$, of the materials from which the lens elements are made up, with the subscriptions numbered consecutively from front to rear. Further, F denotes the focal length of the entire system of the zoom lens, $F_{NO}$ the F-number, and $2\omega$ the image angle.

Figure 5:
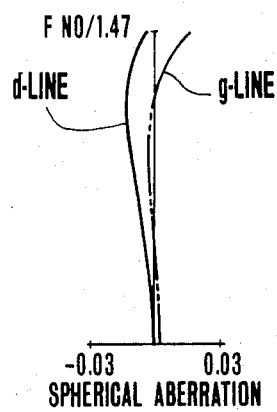
FIGS. 5, 6 and 7 are graphic representations of the various aberrations of the zoom lens of FIG. 4 in the wide angle, intermediate and telephoto positions respectively.
Figure 5:
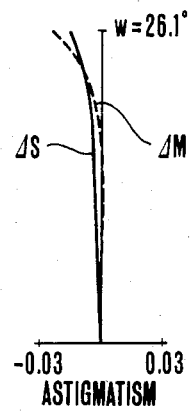
Figure 5:
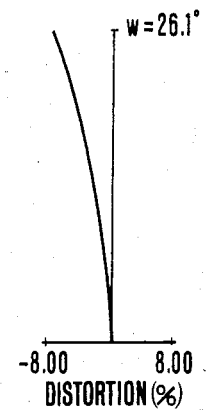
Figure 6:
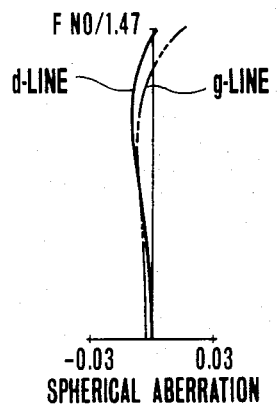
Figure 6:
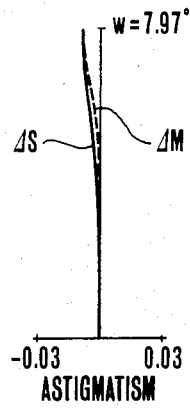
Figure 6:
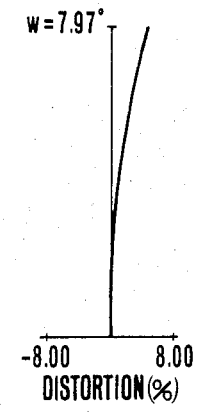
Figure 7:
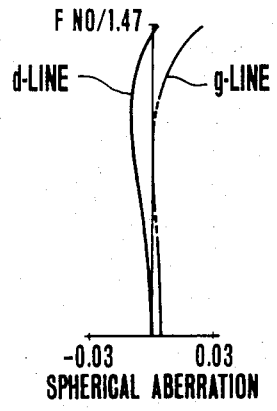
Figure 7:
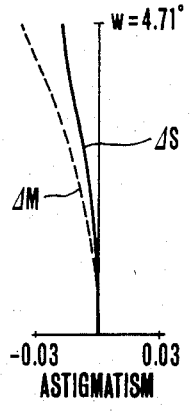
Figure 7:
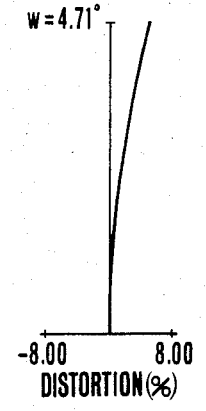

All the aberrations of this specific lens are shown in FIGS. 5 to 7 for the wide angle, intermediate and telephoto positions respectively.

| F = 1.00–5.95 | FNO = 1:1.47 | 2ω = 52.2°–9.42° | |
|---|---|---|---|
| R1 = 10.283 | D1 = 0.19 | N1 = 1.80518 | ν1 = 25.4 |
| R2 = 4.845 | D2 = 0.98 | N2 = 1.51633 | ν2 = 64.1 |
| R3 = −14.680 | D3 = 0.02 | | |
| R4 = 4.321 | D4 = 0.62 | N3 = 1.49171 | ν3 = 57.4 |
| R5 = 28.962 | D5 = Variable | | |
| R6 = −34.177 | D6 = 0.10 | N4 = 1.71300 | ν4 = 53.8 |
| R7 = 2.164 | D7 = 0.42 | | |
| R8 = −3.027 | D8 = 0.10 | N5 = 1.71300 | ν5 = 53.8 |
| R9 = 1.903 | D9 = 0.34 | N6 = 1.80518 | ν6 = 25.4 |
| R10 = 30.018 | D10 = Variable | | |
| R11 = −2.122 | D11 = 0.12 | N7 = 1.71300 | ν7 = 53.8 |
| R12 = −6.297 | D12 = Variable | | |
| R13 = Stop | D13 = 0.27 | | |
| R14 = 9.767 | D14 = 0.36 | N8 = 1.69100 | ν8 = 54.8 |
| R15 = −2.818 | D15 = 0.09 | | |
| R16 = 2.911 | D16 = 0.32 | N9 = 1.60311 | ν9 = 60.7 |
| R17 = −17.532 | D17 = 0.02 | | |
| R18 = 2.076 | D18 = 0.36 | N10 = 1.60311 | ν10 = 60.7 |
| R19 = 12.310 | D19 = 0.11 | | |
| R20 = −5.198 | D20 = 0.09 | N11 = 1.80518 | ν11 = 25.4 |
| R21 = 4.627 | D21 = 0.96 | | |
| R22 = 47.401 | D22 = 0.09 | N12 = 1.80518 | ν12 = 25.4 |
| R23 = 1.797 | D23 = 0.22 | | |
| R24 = 5.734 | D24 = 0.36 | N13 = 1.60738 | ν13 = 56.8 |
| R25 = −1.955 | D25 = 0.02 | | |
| R26 = 1.804 | D26 = 0.27 | N14 = 1.58875 | ν14 = 51.2 |
| R27 = 7.375 | | | |

| F | 1.00 | 3.50 | 5.95 |
|---|---|---|---|
| D5 | 0.105 | 2.81 | 3.51 |
| D10 | 3.65 | 0.595 | 0.239 |
| D12 | 0.019 | 0.369 | 0.029 |

What we claim:

1. A photographic apparatus having a zoom lens, comprising:
a zoom lens which can change its focal length continuously within a predetermined range wherein a first lens group positioned at the frontmost side within said zoom lens has at least one plastic lens and lens systems subsequent to said first lens group having no plastic lenses;
means for receiving a light bundle from said zoom lens to detect whether or not an image of an object is in an in focus state or not; and
means for shifting said first lens group in the direction of the optical axis relative to said lens systems subsequent to said first lens group corresponding to the in focus state obtained from said detection means for having the light bundle image at an optically conjugate position with a fixed image plane position of said zoom lens and wherein said detection means has an autofocus function and said first lens group is shifted in correspondence with an in focus signal from said detection means.

2. A zoom lens according to claim 1, wherein said member of a plastic material arranged in said first lens group consists of at least one positive lens and at least one negative lens.

3. A zoom lens according to claim 1, wherein the means for shifting said first lens group has a stop and said stop is arranged at a position which is further beyond a position within said first lens group corresponding to an infinitely distant object.

4. A photographic apparatus having a zoom lens, comprising:
a zoom lens which can change its focal length continuously within a predetermined range wherein a first lens group positioned at the frontmost side within said zoom lens has at least one plastic lens and lens systems subsequent to said first lens group having no plastic lenses;
means for receiving a light bundle from said zoom lens to detect whether or not an image of an object is in an in focus state or not; and
means for shifting said first lens group in the direction of the optical axis relative to said lens systems subsequent to said first lens group corresponding to the in focus state obtained from said detection means for having the light bundle image at an optically conjugate position with a fixed image plane position of said zoom lens and wherein said detection means has an electronic viewfinder.

5. A zoom lens according to claim 4, wherein said member of a plastic material arranged in said first lens group consists of at least one positive lens and at least one negative lens.

6. A zoom lens according to claim 4, wherein the means for shifting said first lens group has a stop and said stop is arranged at a position which is further beyond a position within said first lens group corresponding to an infinitely distant object.

7. A photographic apparatus having a zoom lens, comprising:
a zoom lens which can change its focal length continuously within a predetermined range wherein a first lens group positioned at the frontmost side within said zoom lens has at least one plastic lens and lens systems subsequent to said first lens group having no plastic lenses;
means for receiving a light bundle from said zoom lens to detect whether or not an image of an object is in an in focus state or not; and
means for shifting said first lens group in the direction of the optical axis relative to said lens systems subsequent to said first lens group corresponding to the in focus state obtained from said detection means for having the light bundle image at an optically conjugate position with a fixed image plane position of said zoom lens, and
wherein said detection means comprises a viewfinder, a mirror for guiding at least a portion of a light bundle passing through said photo-taking system toward said viewfinder and a focusing detection mechanism arranged at a position conjugate to an image plane.

8. A zoom lens according to claim 7, wherein said member of a plastic material arranged in said first lens group consists of at least one positive lens and at least one negative lens.

9. A zoom lens according to claim 7, wherein the means for shifting said first lens group has a stop and said stop is arranged at a position which is further beyond a position within said first lens group corresponding to an infinitely distant object.

10. A photographic apparatus having a zoom lens, comprising:
a zoom lens which can change its focal length continuously within a predetermined range wherein a first lens group positioned at the frontmost side within said zoom lens has at least one plastic lens and lens systems subsequent to said first lens group having no plastic lenses;
means for receiving a light bundle from said zoom lens to detect whether or not an image of an object is in an in focus state or not; and
means for shifting said first lens group in the direction of the optical axis relative to said lens systems subsequent to said first lens group corresponding to the in focus state obtained from said detection means for having the light bundle image at an optically conjugate position with a fixed image plane position of said zoom lens, wherein said detection means comprises a viewfinder, a mirror for guiding at least a portion of a light bundle passing through said photo-taking system toward said viewfinder and a focusing detection mechanism arranged at a position conjugate to an image plane and wherein said focusing detection mechanism consists of a split prism.

11. A photographic apparatus having a zoom lens, comprising:

a zoom lens which can change its focal length continuously within a predetermined range wherein a first lens group poisitioned at the frontmost side within said zoom lens has at least one plastic lens and lens systems subsequent to said first lens group having no plastic lenses;

means for receiving a light bundle from said zoom lens to detect whether or not an image of an object is in an in focus state or not; and means for shifting said first lens group in the direction of the optical axis relative to said lens systems subsequent to said first lens group corresponding to the in focus state obtained from said detection means for having the light bundle image at an optically conjugate position with a fixed image plane position of said zoom lens, wherein said detection means comprises a viewfinder, a mirror for guiding at least a portion of a light bundle passing through said photo-taking system toward said viewfinder and a focusing detection mechanism arranged at a position conjutage to an image plane and wherein said focusing detection mechanism consists of a micro-prism.

12. A photographic apparatus having a zoom lens, comprising:

a zoom lens which can change its focal length continuously within a predetermined range wherein a first lens group positioned at the frontmost side within said zoom lens has at least one plastic lens and lens systems subsequent to said first lens group having no plastic lenses;

means for receiving a light bundle from said zoom lens to detect whether or not an image of an object is in an in focus state or not; and means for shifting said first lens group in the direction of the optical axis relative to said lens systems subsequent to said first lens group corresponding to the in focus state obtained from said detection means for having the light bundle image at an optically conjugate position with a fixed image plane position of said zoom lens, wherein said detection means comprises a viewfinder, a mirror for guiding at least a portion of a light bundle passing through said photo-taking system toward said viewfinder and a focusing detection mechanism arranged at a positon conjugate to an image plane and wherein said focusing mechanism comprises a matt surface or matt surfaces.

* * * * *